(12) United States Patent
Taylor

(10) Patent No.: US 6,196,456 B1
(45) Date of Patent: Mar. 6, 2001

(54) AUTOMATED TELLER MACHINE

(75) Inventor: Michael Taylor, Dundee (GB)

(73) Assignee: NCR Corporation, Dayton, OH (US)

(*) Notice: Subject to any disclaimer, the term of this patent is extended or adjusted under 35 U.S.C. 154(b) by 0 days.

(21) Appl. No.: 09/259,083

(22) Filed: Feb. 26, 1999

(30) Foreign Application Priority Data

May 23, 1998 (GB) .................................................. 9811071

(51) Int. Cl.[7] .................................................. G06F 17/60
(52) U.S. Cl. .......................... 235/379; 235/380; 235/381; 705/64
(58) Field of Search .................................. 235/379, 380, 235/381; 705/64, 75, 35, 44, 43; 709/252

(56) References Cited

U.S. PATENT DOCUMENTS

| | | | |
|---|---|---|---|
| 4,249,163 | * 2/1981 | Maurer et al. | 340/149 |
| 4,375,032 | 2/1983 | Uchida | 235/380 |
| 4,890,323 | 12/1989 | Beker et al. | 380/25 |
| 5,557,778 | * 9/1996 | Vaillancourt | 395/500 |
| 5,696,824 | * 12/1997 | Walsh | 380/24 |
| 6,000,608 | * 12/1999 | Dorf | 235/380 |
| 6,032,135 | * 2/2000 | Molano et al. | 705/41 |
| 6,068,184 | * 5/2000 | Barnett | 235/379 |
| 6,092,202 | * 7/2000 | Veil et al. | 713/201 |

FOREIGN PATENT DOCUMENTS

| | | |
|---|---|---|
| 0089087 | 9/1983 | (EP) . |
| 9600485 | 1/1996 | (WO) . |
| 9812641 | 3/1998 | (WO) . |

* cited by examiner

Primary Examiner—Thien M. Le
Assistant Examiner—Daniel S Felten

(57) ABSTRACT

The present invention relates to an automated teller machine including a secure enclosure (25) within which is a secure autoteller subsystem (24) comprising a currency dispenser (30) and a depository (32) for the deposit of currency, cheques or other financial instruments. The secure enclosure (25) encloses an input data port (24a), a hub (26) in data communication with the input port, and a plurality of downstream ports (29,31) in data communication with the hub. The currency dispenser and depository are in data communication with the downstream ports respectively. A hub controller (34) is in data communication with the input port to control data communications from the hub to the downstream ports, the hub controller being adapted to authorize access from the hub to the downstream ports in response to an exchange of authentication codes between the hub controller and the input port. The hub (26) of the secure autoteller subsystem (24) is connected with many other hubs (15,16) to a host data processor (10) through a bus system configured in a tiered star arrangement.

10 Claims, 3 Drawing Sheets

AUTOMATED TELLER MACHINE

BACKGROUND OF THE INVENTION

The present invention relates to an automated teller machine including a secure enclosure within which a plurality of teller machine utilities are disposed. Such utilities may comprise a currency dispenser and a depository for the deposit of currency, cheques or other financial instruments.

It is necessary for an automated teller machine to be secured against unauthorized access which could result in the fraudulent operation of the utilities which form part of the teller machine. Nevertheless it is necessary for the teller machine to be in data communication with a host data processor which provides control data to operate the teller machine. Such data communication takes place conventionally through an input port into the secure enclosure of the machine.

It is known to utilize a serial data bus for communication from a host processor to the utilities of the teller machine. The utilities are connected to the data bus in a serial "daisy chain" fashion so that the utilities are addressable through the serial bus linking the utilities. The communications with the individual utilities are encrypted in an attempt to combat the unauthorized interception of communications between the host processor and the teller machine and the communication of fraudulent messages over the serial link. Nevertheless, a breach in the security of the encryption codes will compromise the security of operation of the teller machine.

A need therefore exists to improve on the level of security beyond that provided by the use of encryption codes between a host processor and a teller machine.

SUMMARY OF THE INVENTION

According to the present invention there is now provided an automated teller machine comprising a secure enclosure enclosing;

an input data port, a hub in data communication with the input port, a plurality of downstream ports in data communication with the hub, a plurality of teller machine utilities in data communication with the downstream ports respectively, and a hub controller in data communication with the input port to control data communications from the hub to the downstream ports, the hub controller being adapted to authorize access from the hub to the downstream ports in response to an exchange of authentication codes between the hub controller and the input port.

The authentication codes employed by the hub controller allow a level of security which enables even the identity of the protected utilities to be hidden from unauthorized communication.

BRIEF DESCRIPTION OF THE DRAWINGS

The invention will now be described further, by way of example with reference to the accompanying drawings in which.

DETAILED DESCRIPTION

Figure 1:
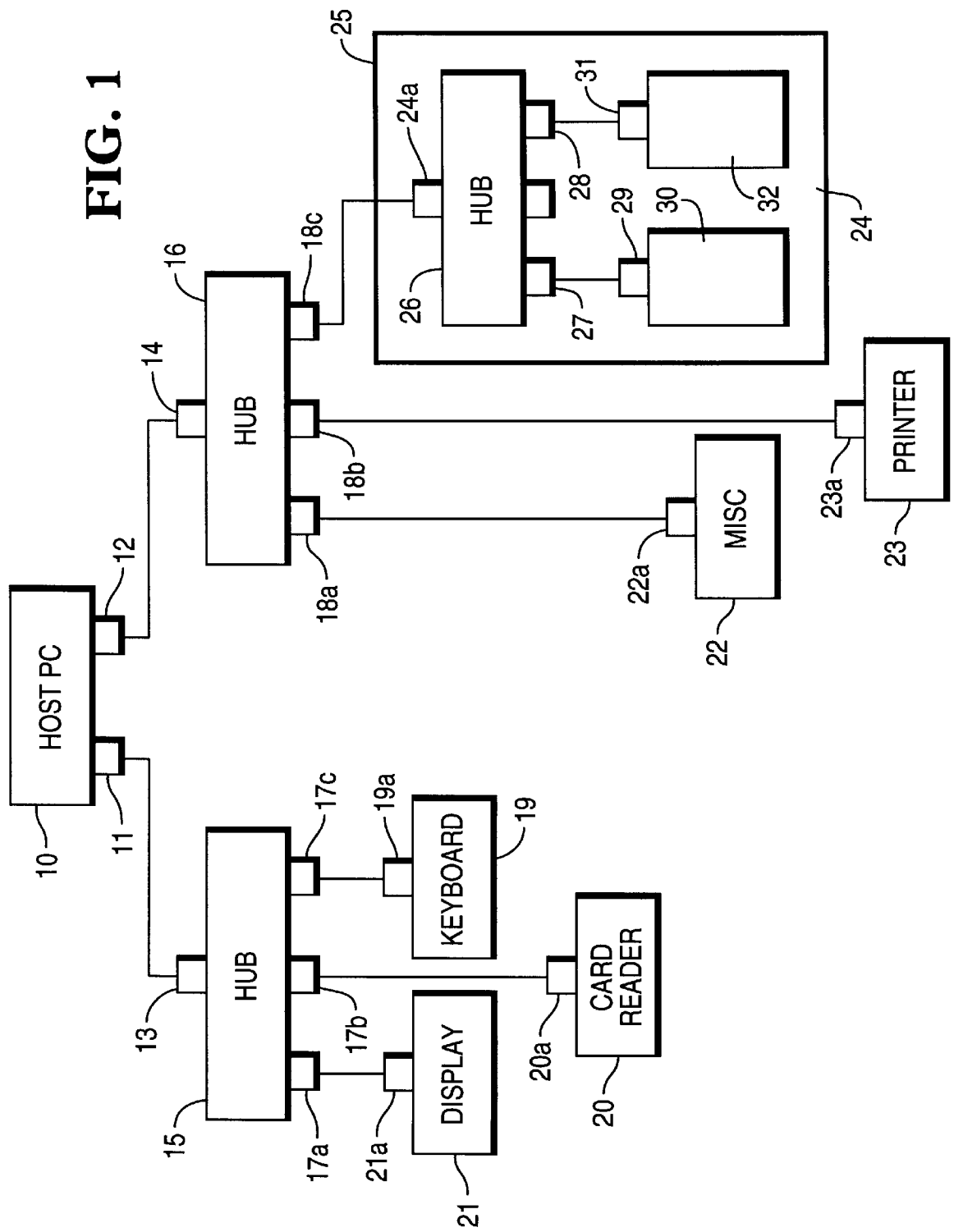
FIG. 1 shows an automated teller machine having a secure autoteller subsystem 24 connected in data communication with a host processor.

In FIG. 1, a host digital data processor 10 has first and second output data ports 11 and 12 connected respectively to input or upstream data ports 13 and 14 of first and second hubs 15 and 16. The hub 15 has a plurality of downstream or output data ports 17a, 17b and 17c and the hub 16 has downstream or output data ports 18a, 18b and 18c. Whilst only three downstream data ports have been shown for each hub 15 and 16, it will be understood that the number of downstream data ports may be varied and is not essential to the present invention.

Each downstream data port 17a, 17b and 17c is connected to a respective peripheral device so as to put the respective peripheral device into data communication with the digital data processor 10. A keyboard 19 has an input data port 19a connected for data communication with the downstream port 17a, a card reader 20 has an input data port 20a connected for data communication with the downstream port 17b, and a display device 21 has an input data port 21a connected for data communication with the downstream port 17c.

Each downstream port 18a, 18b and 18c of the hub 16 is also connected to an input or upstream port of a respective peripheral device so as to put the peripheral device into data communication with the data processor 10. A miscellaneous communication peripheral device 22 including a telecommunications modem has an input port 22a connected to the downstream port 18a. A printer 23 has an input port 23a connected for data communication with the downstream port 18b, and a secure autoteller subsystem 24 has an input port 24a connected for data communication with the data processor 10.

It will be noted that the bus system connecting the data processor 10 and the individual terminals has a tiered star topology where each link segment is point-to point. The use of hubs with one upstream port and many downstream ports allows the links to fan out to many peripheral devices. A suitable bus topology for implementing the invention is the Universal Serial Bus (USB).

The secure autoteller subsystem 24 is situated inside a security enclosure or safe 25. The input port 24a of the subsystem 24 is connected to a hub 26. The hub 26 has two downstream ports 27 and 28 connected respectively to a data input port 29 of a currency dispenser 30 and the data input port 31 of a depository 32. The data processor 10 can address packets of data to the peripheral devices through the data ports of the hubs. The hubs are adapted to repeat the data packets addressed to them and direct packets to the appropriate downstream port of the hub so as to pass through the tiers of the bus system to reach the required peripheral device.

Figure 2:
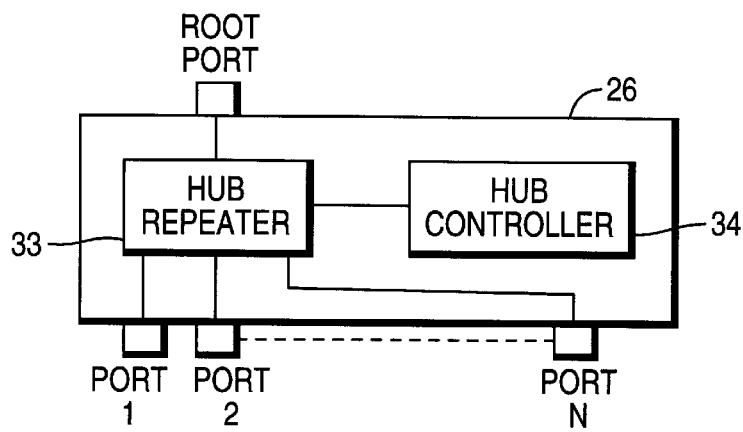
FIG. 2 shows further detail of a hub and hub controller of a teller machine in the system of FIG. 1, and FIGS. 3A and 3B show steps in the operation of FIGS. 1 and 2.

In FIG. 2, the hub 26 of the autoteller subsystem 24 has a hub repeater 33 connected to the input data port 24a and the downstream data ports 29 and 31. The hub repeater is also connected to a hub controller 34 which controls the data communication through the hub 26. Additional downstream ports are provided as indicated in FIG. 2 for data communication with further optional peripherals. Each of the downstream ports of the autoteller subsystem 24 can be in one of a number of logical states. These states include a powered off state, a disconnected state, a disabled state, an enabled state and a suspended state. Transitions between the states are controlled by the hub controller 34 in response to physical power on/off and connect/disconnect events and to commands from the hub controller 34.

Figure 3A:
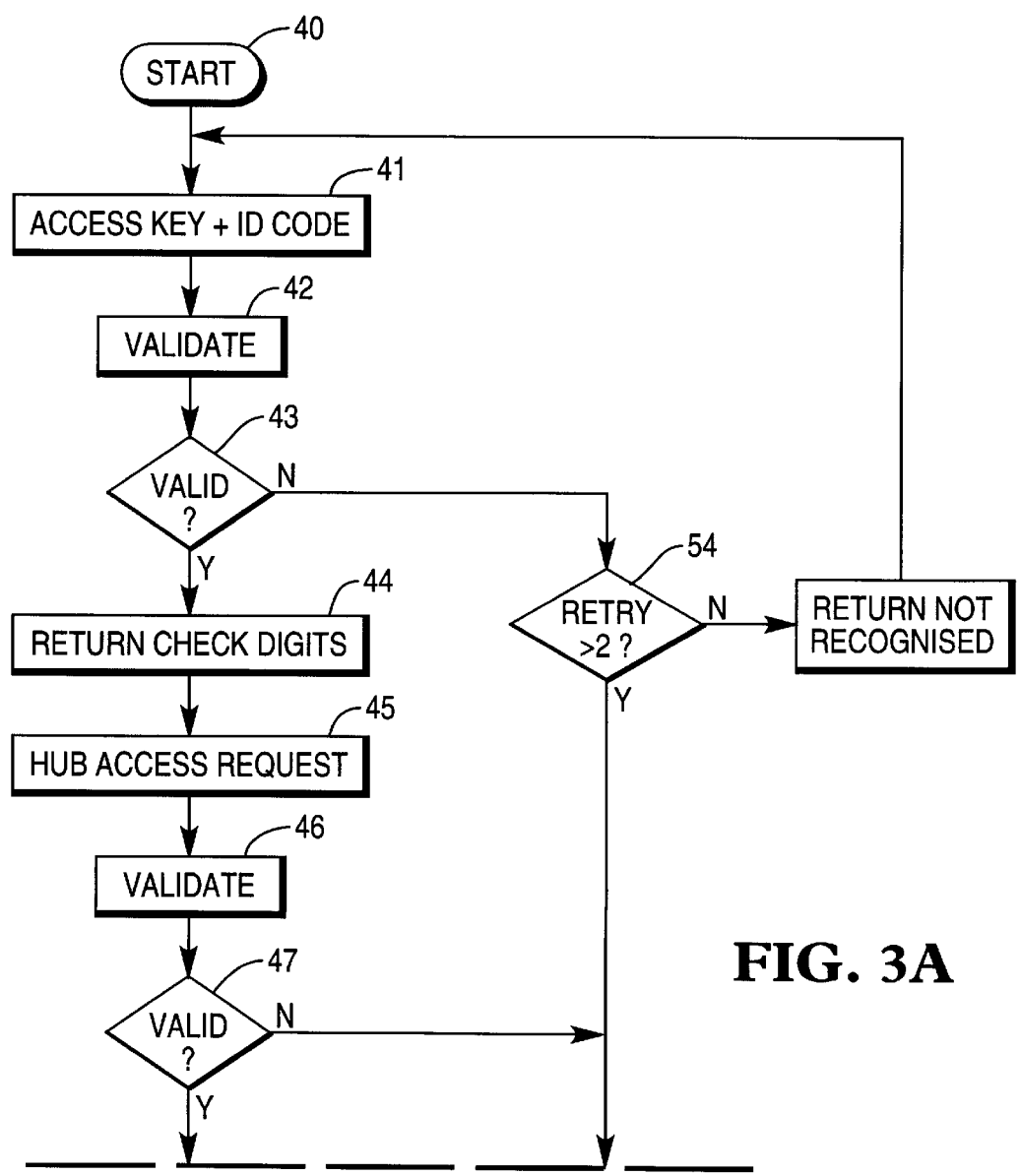
Figure 3B:
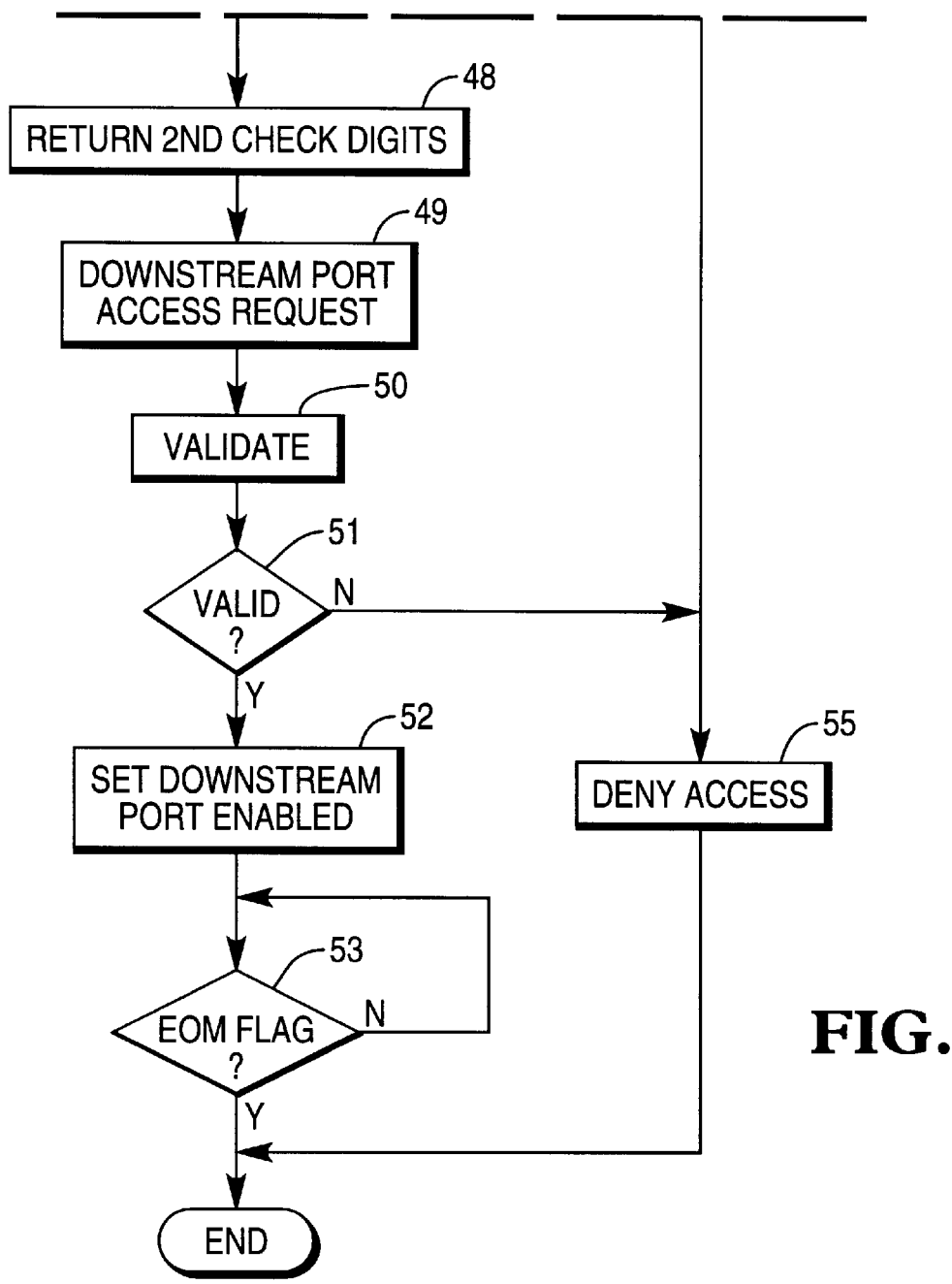

In FIGS. 3A and 3B, the operation of addressing the secure autoteller subsystem 24 begins at the starting point 40. In step 41, the data processor 10 addresses an access key and an identity code to the subsystem 24 which is received through the input port 24a and applied to the hub 26. The hub controller 34 subjects the digits of the access key and the identity code to a checking algorithm in step 42 to determine whether the access requested by the data processor 10 is valid. The access key, the identity code and the checking algorithm may take any of a variety of forms which are known in the art.

In step 43 the result of validation is checked and, if the access request is valid, the hub controller returns an authentication code in the form of check digits to the data processor 10 in step 44. The data processor subjects the check digits to a processing algorithm in step 45 to formulate and return a hub access request. The hub access request is received by the hub controller 34 and subjected to a second checking algorithm in step 46. The result of the validation in step 46 is checked in step 47. If the hub access request is valid, the hub controller returns a second authorization code in the form of check digits to the data processor 10 in step 48.

The data processor 10 subjects the second check digits to a second processing algorithm to formulate and return a specific downstream port access request in step 49. The port access request is received by the hub controller and subjected to a third checking algorithm in step 50. The result of the validation in step 50 is checked in step 51. If the port access request is valid, the hub controller 34 sets the downstream port selected by the data processor 10 to an enabled state in step 52. The data processor 10 is now in data communication with the selected downstream port of the subsystem 24 and can communicate operating instructions to the attached peripheral. The hub controller 34 monitors the data communication passing through the hub repeater 33 and detects in step 53 the end of the communication which is flagged by an end of message flag.

If the validation step 42 is checked in step 43 and found to result in an unrecognized source of access request, a check is made in step 54 to determine whether more than two earlier such attempts have been made. If this is the third invalid attempt, the check in step 54 results in denial of access in step 55 and the termination of the access operation. On the other hand, if this is the first or second such invalid attempt at access, the hub controller returns a message that the data source has not been recognized and requests a further attempt.

If the validation operation in step 46 is checked in step 47 and found to result in an invalid hub access request, the access is denied in step 55 and the access operation is terminated. Similarly, if the validation operation in step 50 is checked in step 51 and found to result in an invalid port access request, the access is denied in step 55 and the access operation is terminated.

The data communications between the data processor 10 and the peripherals connected to the bus system are in encrypted form to provide a first level of security against unauthorized access to the cable links of the bus system. This first level of security applies to the communications to all the peripherals. A second level of security is provided for the peripherals of the autoteller subsystem 24. The second level of security is provided by the enclosure or safe 25 preventing access to the links inside the safe 25 and by the authentication demanded between the data processor 10 the hub controller 34. The authentication is performed by the exchange of authorization codes so that a user is correctly identified and the hub access request and the port access request are correctly identified. Because of the tiered star topology of the bus system, information to access individual peripherals is not required to pass serially through all the peripherals and the identity and number of peripherals within the safe 25 can be hidden with enhanced security.

Whilst only one secure autoteller subsystem 24 has been shown in FIGS. 1 and 2 it will be apparent that the system may include a plurality of such subsystems connected to the data processor 10, for example in the arrangement known as a sidecar. Also, in the example, the secure subsystem 24 has both a dispenser and a depository; in variations, either a dispenser alone or a depository alone could be provided.

What is claimed is:

1. An automated teller machine comprising;

an input data port;

a hub in data communication with the input port;

a plurality of downstream ports in data communication with the hub;

at least one teller machine utility in data communication with the downstream ports respectively; and a hub controller in data communication with the input port to control data communications from the hub to the downstream ports and for authorizing access from the hub to the downstream ports in response to an exchange of authentication codes between the hub controller and the input port.

2. An automated teller machine according to claim 1, further comprising a cash dispenser.

3. An automated teller machine according to claim 1, further comprising a depository.

4. An automated teller machine according to claim 1, wherein the downstream ports are each switchable between a plurality of states under the control of the hub controller, the plurality of states including an enabled state and a disabled state.

5. An automated teller machine according to claim 1, wherein the hub controller includes a processor for validating authentication codes relating to access through the input port to the hub and further authentication codes relating to access through the hub to individual downstream ports.

6. A method of operating an automated teller machine (ATM) having a hub in communication with an input data port and a number of downstream ports in data communication with at least one teller machine utility, the method comprising the steps of:

(a) authorizing access from the hub to the downstream ports in response to an exchange of authentication codes; and (b) controlling data communications from the hub to the downstream ports when access from the hub to the downstream ports is authorized.

7. A method according to claim 6, further comprising the step of:

(c) validating authentication codes relating to access through the input port to the hub.

8. A method according to claim 6, further comprising the step of:

(c) validating authentication codes relating access through the hub to the downstream ports.

9. A method according to claim 6, further comprising the steps of:

(c) validating authentication codes relating to access through the input port to the hub; and (d) validating authentication codes relating access through the hub to the downstream ports.

10. A system comprising:

a host data processor; and a bus including a plurality of hubs connected to the host data processor and connected in a tiered star topology, each hub having an input data port and a plurality of downstream data ports in data communication with the hub, each downstream data port being connected to a respective peripheral device, at least two of the hubs comprising a hub of an automated teller machine, one hub being arranged as a sidecar.

* * * * *